Patented May 17, 1949

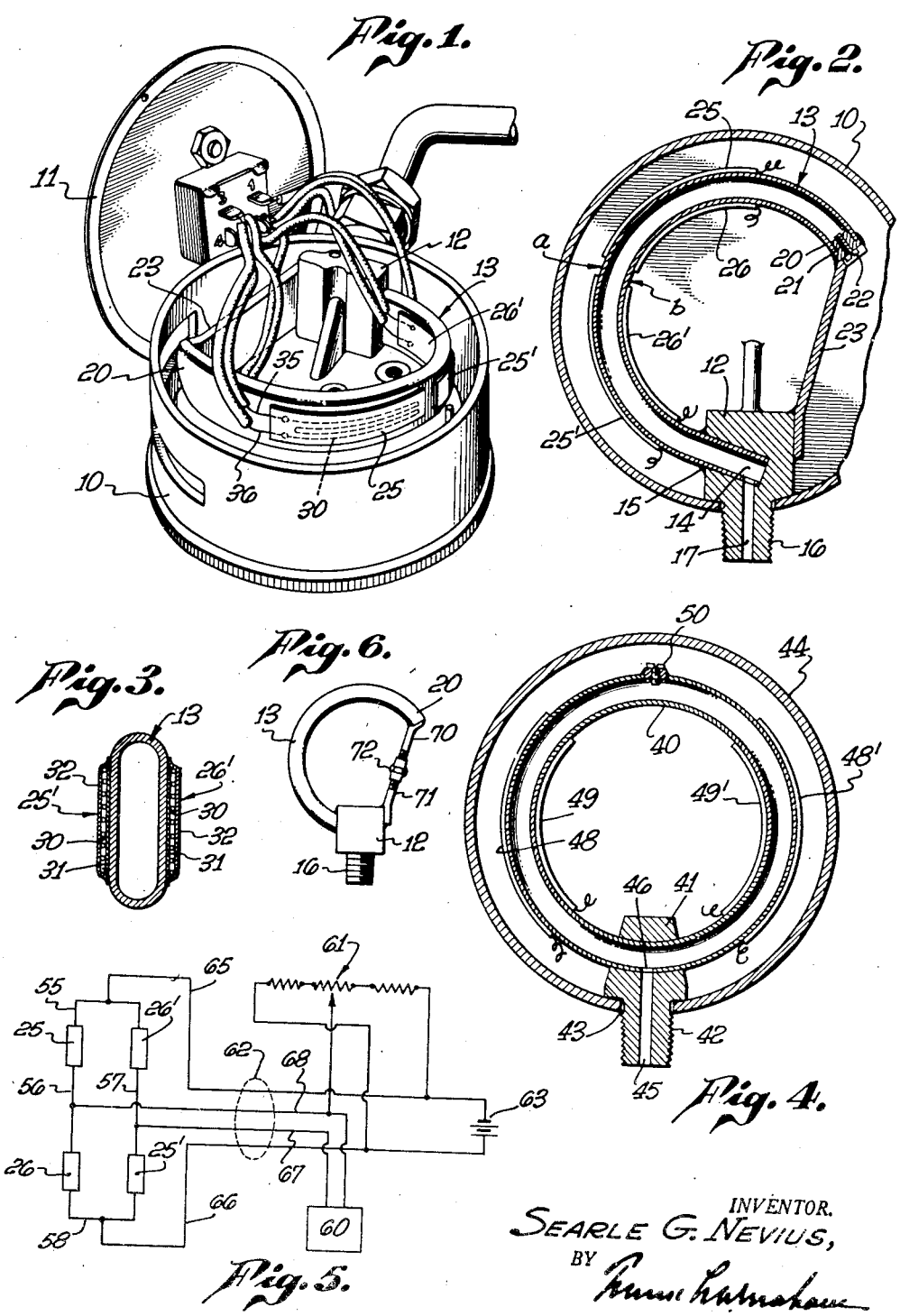
May 17, 1949.    S. G. NEVIUS    2,470,714
ELECTRIC PRESSURE INDICATOR
Filed Feb. 9, 1945
INVENTOR.
SEARLE G. NEVIUS,
BY
ATTORNEY.

2,470,714

UNITED STATES PATENT OFFICE 2,470,714

ELECTRIC PRESSURE INDICATOR

Searle G. Nevius, Santa Monica, Calif.

Application February 9, 1945, Serial No. 577,090

5 Claims. (Cl. 201—63)

This invention relates to a dynamic and static pressure pick-up device and consists primarily of a pressure sensitive element which imposes strain in a strain sensitive wire.

In the form of invention herein disclosed the device embodies an unconventional application of what is commonly known as a Bourdon tube. In the conventional type of Bourdon tube as used in the ordinary Bourdon tube pressure gauge, one end of the Bourdon tube is fixed and the other end free to move according to pressure differentials on the tube. In the present invention both ends of the Bourdon tube are fixed with relation to each other so that neither end of the tube is free to move so that any pressure in the pressure chamber or inside of the tube by any fluid or gas introduced into the tube is transmitted to the walls of the tube and tends to alter the cross sectional shape of the tube; that is, if the pressure on the inner wall of the tube is greater than on the outer wall of the tube, the tube will tend to increase its cross sectional area and in doing so tensional strains are set up in the outer wall of the tube and compression strains in the inner wall of the tube. When the pressure differential is reversed these strains are reversed.

This phenomenon is taken advantage of by attaching strain sensitive elements, such as the well known carbon or resistance wire strain gauges, on the outer and inner walls of the tube. Through proper design, arrangement, materials and operating conditions these strains can be made directly proportional to the pressure differential for all practical purposes.

By properly orientating the strain sensitive elements on the surfaces of the walls of the tube, active legs of an electrical bridge can be had and when electrical power is supplied to the bridge the output signal of the bridge will involve a function of the pressure differential. This signal can be used through proper instrumentalities to operate various indicating and control equipment. In some cases amplification of the signal may be desirable or necessary and this may be accomplished with various forms of apparatus available for that purpose.

It is the principal object of this invention to produce a pressure pick-up device of the character described of simple form and operation in which maximum strain signals may be produced in strain sensitive elements at minimum volumetric displacements.

Another object of this invention is to produce a pressure pick-up device of the character described of simple form and operation in which a plurality of strain sensitive elements may be so arranged as to form the four legs of an electrical bridge in which equal and opposite signals may be obtained of maximum signal output.

Other objects and advantages will appear hereinafter from the following description and drawings.

Referring to the drawings, which are for illustrative purposes only:

Fig. 1 is a perspective view looking down into an instrument embodying a preferred form of my invention, the cover being raised to expose the arrangement of mechanism in the instrument;

Fig. 2 is an enlarged sectional plan view of the instrument shown in Fig. 1;

Fig. 3 is an enlarged cross sectional view of the tube and strain sensitive elements or units thereon;

Fig. 4 is a view similar to Fig. 2 showing an instrument embodying a modified form of my invention;

Fig. 5 is a diagram showing a form of electrical connections which may be used in connection with an instrument embodying my invention; and Fig. 6 is a diagrammatic fragmentary plan view of another modified form of my invention.

Referring more particularly to the drawings, 10 designates a circular box or case provided with a top or lid 11. Extending upwardly from the floor or bottom of the case is a post 12. Designated by the numeral 13 is a Bourdon tube extending in circular form in the case, the open end 14 of the tube being fixed in the post 12 in any suitable manner, as by welding indicated at 15. This tube is elliptical in cross section and is referred to herein as a Bourdon tube. The post 12 is provided with a threaded nipple 16 extending through the case for connection to any apparatus containing a fluid of the nature of air or liquid upon which the tests are to be made. The nipple 16 is provided with a duct or passage 17 which connects at its inner end with the interior of the tube 13.

In the form of my invention shown in Figs. 1 and 2, the tube 13 extends less than 360°, being somewhat over 180°. The outer end 20 of the tube is closed by a plug 21 but is provided with a screw closure 22 which can be loosened to permit the exhaust of air from the tube when liquid is introduced into the tube through the passage 17. Unlike the common Bourdon tube, the outer end of the tube of my invention is fixed and, in the form shown in Figs. 1 and 2, this is accomplished by an arm or plate 23, one end of which is welded to the tube and the other end of which is welded to the post 12, it being understood that the tube 13 is free of the floor or bottom of the case.

As shown, the tube 13 has attached thereto strain sensitive elements 25 and 25' on the outer wall of the tube and strain sensitive elements 26 and 26' on the inner wall of the tube. These strain sensitive elements may be made in various forms but as illustrated (see Fig. 3) consist of commonly used carbon or resistance wire elements made by wrapping a length of wire in an elongated flat coil 30 on a sheet of rice paper 31, cementing the wire to the paper, placing another sheet 32 on the wire and cementing the unit or element so formed to the walls of the tube. The ends 35 and 36 of the wire in each strain sensitive element extend from the respective elements or units to proper electrical connections as more fully hereinafter understood.

Fig. 4 illustrates a modified form of tube arrangement. It has been pointed out hereinabove that the tube of my invention differs from the ordinary tube of the Bourdon type of gauge by reason of the fact that in the present invention the tube does not have what may be termed a free end.

In Fig. 4 the tube is arranged in circular form as indicated at 40, the tube being supported in a post or plug indicated at 41 which has a threaded nipple 42 extending through an opening 43 in the instrument case indicated at 44. The passage 45 in the nipple 42 is in open communication with the interior of the tube as indicated at 46. In this form of my invention the same arrangement of strain sensitive elements is used as shown in the form illustrated in Figs. 1 to 3; that is, strain sensitive elements are used on the tube consisting of strain sensitive elements 48 and 48' on the outer wall of the tube and strain sensitive elements 49 and 49' on the inner wall of the tube. Also in this form of my invention the tube is provided with a screw closure indicated at 50 which may be opened to permit air in the tube to be exhausted.

In Fig. 5 I have diagrammatically illustrated one form of electrical connections which may be used for translating the signals from the strain sensitive elements. In this diagram the strain sensitive elements are indicated at 25, 26, 25' and 26'. These are connected in circuit as shown by conductors 55, 56, 57 and 58. 60 indicates a recording or control instrument; 61 indicates a balancing system; 62 indicates a transmission cable and 63 indicates a power source. The ends of the circuit connecting the strain sensitive elements are connected by conductors 65 and 66 to the power source and such circuit is also connected through conductors 67 and 68 to the recording instrument.

The instrument so far described operates in the following manner. Pressure which is negative or positive, static or dynamic, relative to that which is outside of the tube and transmitted by any fluid material such as liquid or gas, enters as for instance in the forms shown in Figs. 1 and 2 through the passage 17 in the nipple 16 to the inside of the tube 13. This pressure differential tends to alter the cross sectional shape of the tube. If the pressure on the inside of the tube is greater than on the outside of the tube the cross sectional area of the tube will tend to increase. In doing so tension strains are set up in the outer wall of the tube designated at $a$ in Fig. 2 and compression strains are set up in the inner wall $b$. When the pressure strains are reversed the cross sectional area of the tube tends to become smaller. Through the arrangement of the pressure sensitive elements on the outer and inner walls of the tube these strains can be made directly proportional to the pressure differential for all practical purposes. By orientating these strain sensitive elements they become active legs of an electrical bridge such as illustrated in Fig. 5 and when electrical power is supplied to this bridge the output signal of the bridge will involve a function of the pressure differential and this signal can then be used for operating various indicating, recording and controlling equipment, it being understood that, if desirable, these signals can be amplified in any manner well known in the electrical field.

From the foregoing it will appear that:

1. The convex and concave outer areas of the tube exhibit large uniform strains for relatively small pressure differentials and are suitable mounting areas for special strain gauges.
2. The strains in the convex and concave sides of the tube are of opposite signs, thus allowing all four legs of a strain gauge bridge, thereon mounted, to be active for maximum sensitivity.
3. The natural frequency of the tube is greatly increased which in turn raises the upper frequency limit to which dynamic pressure measurements can be made.
4. The strains and corresponding signal output of the strain gauge bridge are directly proportional to the pressure differentials.
5. Inherent temperature compensation is afforded by having all four legs of the strain gauge bridge on the same element.
6. The volumetric change within the tube, due to a pressure differential, is considerably reduced.

In Fig. 5 I have disclosed electrical means whereby the electrical balance of the bridges may be altered. This may be done mechanically, as for example, as diagrammatically illustrated in Fig. 6, instead of an arm or plate 23 as shown in Figs. 1 and 2 connecting the end 20 of the tube to the post 12 two oppositely threaded studs 70, 71 are used. The stud 70 is secured at one end to the end of the tube 13 and the other stud 71 is secured at one end to the post 12. 72 indicates a turnbuckle which can be operated to move the end 20 of the tube either outwardly or inwardly as may be required.

For very accurate readings in the presence of severe temperature changes, it may be necessary to introduce additional temperature compensating devices. This may be done by introducing into one or more of the strain sensitive legs of the bridge resistive elements which have the desired characteristics of resistance change with respect to temperature change, such that improved overall temperature compensation is attained.

Although several forms of the invention have been particularly shown and described, it is contemplated that various changes and modifications can be made without departing from the scope of the invention and it is intended to cover such changes and modifications as come within the scope of the claims.

I claim as my invention:

1. In a pressure pick-up instrument, a flexible tube adapted to be flexed by differential in fluid pressure between its interior and exterior, said tube being of curved longitudinal section and having its ends fixed against relative movement, and a strain sensitive element carried by a curved portion of the tube in position to be stressed by flexure of the tube in response to said fluid pressure differential.

2. In a pressure pick-up instrument, a flexible tube adapted to be flexed by differential in fluid pressure between its interior and exterior, said tube being of curved longitudinal section and having its ends fixed against relative movement, and separate strain sensitive elements carried respectively by the inner and outer sides of the tube in position simultaneously to be subjected to compression and tensional stresses by flexure of the tube in response to said fluid pressure differential.

3. In a pressure pick-up instrument, a flexible tube of elongated cross-section adapted to be flexed by differential in fluid pressure between its interior and exterior, said tube being of arched longitudinal section and having its ends fixed against relative movement, and separate strain sensitive elements carried respectively by the inner and outer sides of the tube in position simultaneously to be subjected to compression and tensional stresses by flexure of the tube in response to fluid introduced into the tube and under pressure.

4. In a pressure pick-up instrument, a flexible tube adapted to be flexed by differential in fluid pressure between its interior and exterior, said tube being of curved longitudinal section, means normally fixing the ends of the tube against relative movement, one of said means being adjustable to change the position of an end of the tube in relation to the other end, and separate strain sensitive elements carried respectively by the inner and outer sides of the tube in position simultaneously to be subjected to compression and tensional stresses by flexure of the tube in response to said fluid pressure differential.

5. In a power pick-up instrument, a flexible tube of curved longitudinal section, a pair of anchor members fixedly supporting the respective ends of the tube, a pair of strain sensitive members operable in opposite senses in response to alternations in the cross-sectional shape of the tube, said latter members being arranged respectively in contact with opposite sides of the tube, means for introducing fluid pressure into the tube to alter its cross-sectional shape, and screw means for adjusting one of the anchor members towards and away from the other.

SEARLE G. NEVIUS.

REFERENCES CITED

The following references are of record in the file of this patent:

UNITED STATES PATENTS

| Number | Name | Date |
|---|---|---|
| 1,638,814 | Epstein | Aug. 9, 1927 |
| 2,059,549 | Carlson | Nov. 3, 1936 |
| 2,360,886 | Osterberg | Oct. 24, 1944 |
| 2,365,015 | Simmons | Dec. 12, 1944 |
| 2,373,676 | Germeshausen | Apr. 17, 1945 |
| 2,398,372 | Green | Apr. 16, 1946 |
| 2,420,148 | Ostergren | May 6, 1947 |